United States Patent
Kremer

(10) Patent No.: US 11,148,363 B2
(45) Date of Patent: *Oct. 19, 2021

(54) PLANT COMPRISING AT LEAST ONE APPARATUS FOR ADDITIVELY MANUFACTURING THREE-DIMENSIONAL OBJECTS

(71) Applicant: CONCEPT LASER GMBH, Lichtenfels (DE)

(72) Inventor: Viktor Kremer, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,937

(22) Filed: Feb. 12, 2019

(65) Prior Publication Data

US 2019/0299521 A1 Oct. 3, 2019

(30) Foreign Application Priority Data

Mar. 28, 2018 (EP) .................................. 18164762

(51) Int. Cl.
*B29C 64/20* (2017.01)
*B33Y 30/00* (2015.01)
(Continued)

(52) U.S. Cl.
CPC ............. *B29C 64/20* (2017.08); *B22F 12/00* (2021.01); *B23K 26/34* (2013.01); *B23K 26/354* (2015.10);
(Continued)

(58) Field of Classification Search
CPC ..... B29C 64/20; B29C 64/153; B29C 64/259; B29C 64/30; B33Y 30/00; B33Y 40/00;
(Continued)

(56) References Cited

U.S. PATENT DOCUMENTS 8,888,480 B2 * 11/2014 Yoo ...................... B29C 64/245
425/375
2003/0229416 A1 12/2003 Tai et al.
(Continued)

FOREIGN PATENT DOCUMENTS

CN 105196549 A 12/2015
CN 107775955 A 3/2018
(Continued)

OTHER PUBLICATIONS

European Search Report Corresponding to Application No. 18164762 dated Sep. 18, 2018.

(Continued)

*Primary Examiner* — Nahida Sultana
(74) *Attorney, Agent, or Firm* — Dority & Manning, P.A.

(57) ABSTRACT

Plant (2) comprising at least one apparatus (1) for additively manufacturing three-dimensional objects by means of successive layerwise selective irradiation and consolidation of layers of a build material which can be consolidated by means of an energy source, which plant (2) comprises at least one module (6, 12-14) separably connected or connectable with the apparatus (1), wherein the at least one module (6, 12-14) is moveable in a loading direction (9) into the apparatus (1) and in an unloading direction (10) out of the apparatus (1), wherein the module (6, 12-14) is moved into a work position (11) along the loading direction (9) and out of the work position (11) along the unloading direction (10), wherein the loading direction (9) and the unloading direction (10) comprise at least one directional component extending in the same direction.

14 Claims, 3 Drawing Sheets

Figure 1:
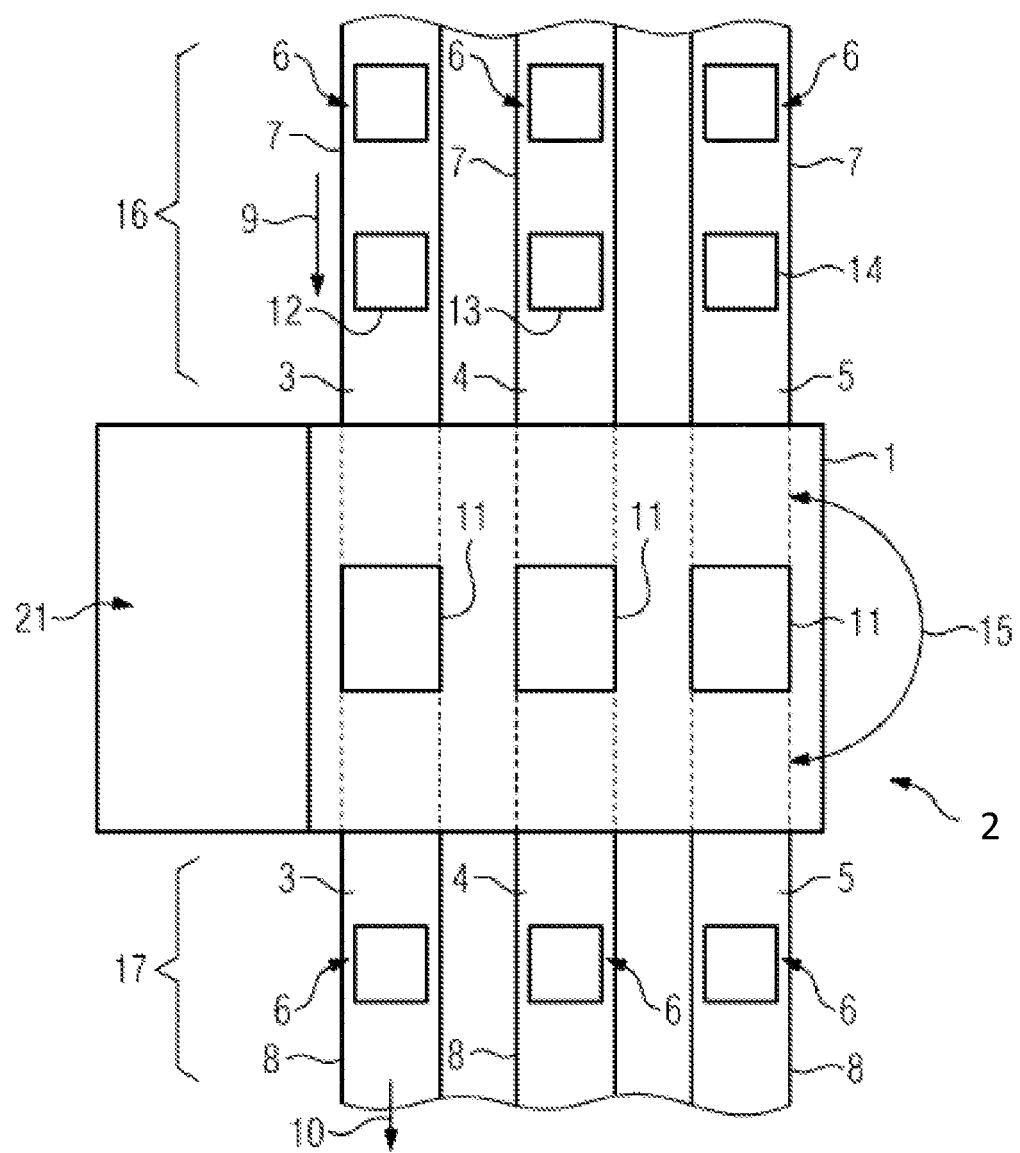

(51) Int. Cl.
    *B33Y 40/00*     (2020.01)
    *B23K 26/354*     (2014.01)
    *B29C 64/30*     (2017.01)
    *B23K 26/34*     (2014.01)
    *B28B 1/00*     (2006.01)
    *B29C 64/153*     (2017.01)
    *B29C 64/259*     (2017.01)
    *B22F 12/00*     (2021.01)
    *B33Y 10/00*     (2015.01)
    *B22F 10/10*     (2021.01)

(52) U.S. Cl.
    CPC ............ *B28B 1/001* (2013.01); *B29C 64/153* (2017.08); *B29C 64/259* (2017.08); *B29C 64/30* (2017.08); *B33Y 30/00* (2014.12); *B33Y 40/00* (2014.12); *B22F 10/10* (2021.01); *B33Y 10/00* (2014.12)

(58) Field of Classification Search
    CPC ...... B33Y 10/00; B23K 26/354; B23K 26/34; B28B 1/001; B22F 2003/1056; B22F 3/008; B22F 3/1055; Y02P 10/25
    See application file for complete search history.

(56) References Cited

U.S. PATENT DOCUMENTS

| | | |
|---|---|---|
| 2012/0305364 A1 | 12/2012 | Morimoto et al. |
| 2018/0056393 A1 | 3/2018 | Herzog et al. |
| 2019/0022799 A1* | 1/2019 | Dohler .................... B29C 64/20 |
| 2019/0061001 A1* | 2/2019 | Araie .................... B29C 64/295 |
| 2020/0087755 A1* | 3/2020 | Beste ...................... C22C 30/00 |
| 2020/0122397 A1* | 4/2020 | Moritz .................. B29C 64/153 |
| 2020/0147978 A1* | 5/2020 | Gila .......................... B41J 3/4076 |
| 2020/0164466 A1* | 5/2020 | Sievers ................. B29C 64/153 |
| 2020/0198228 A1* | 6/2020 | Chillscyzn ............. B29C 64/241 |
| 2020/0338828 A1* | 10/2020 | Indyk ..................... B65G 15/40 |

FOREIGN PATENT DOCUMENTS

| | | |
|---|---|---|
| DE | 102009036153 A1 | 2/2011 |
| EP | 3214024 A1 | 9/2017 |
| JP | 2004/010250 A | 1/2004 |
| JP | 2012/253070 A | 12/2012 |
| JP | 2018/040054 A | 3/2018 |
| WO | 2012128705 A1 | 9/2012 |
| WO | WO2013/152751 A1 | 10/2013 |
| WO | 2017109395 A1 | 6/2017 |

OTHER PUBLICATIONS

Machine Translated Japanese Search Report Corresponding to Application No. 2019026232 dated Jan. 16, 2020.
Machine Translated Japanese Office Action Corresponding to Application No. 2019026232 dated Jan. 31, 2020.
European Office Action Corresponding to Application No. 18164762 dated Feb. 24, 2020.
Chinese Search Report Corresponding to Application No. 201910131566 dated Oct. 26, 2020.

\* cited by examiner

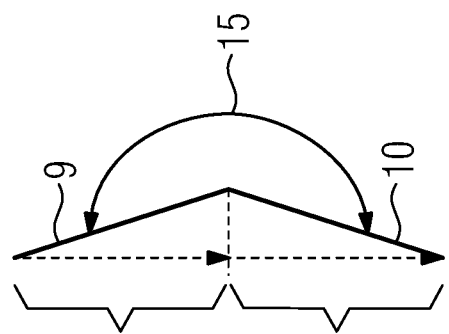
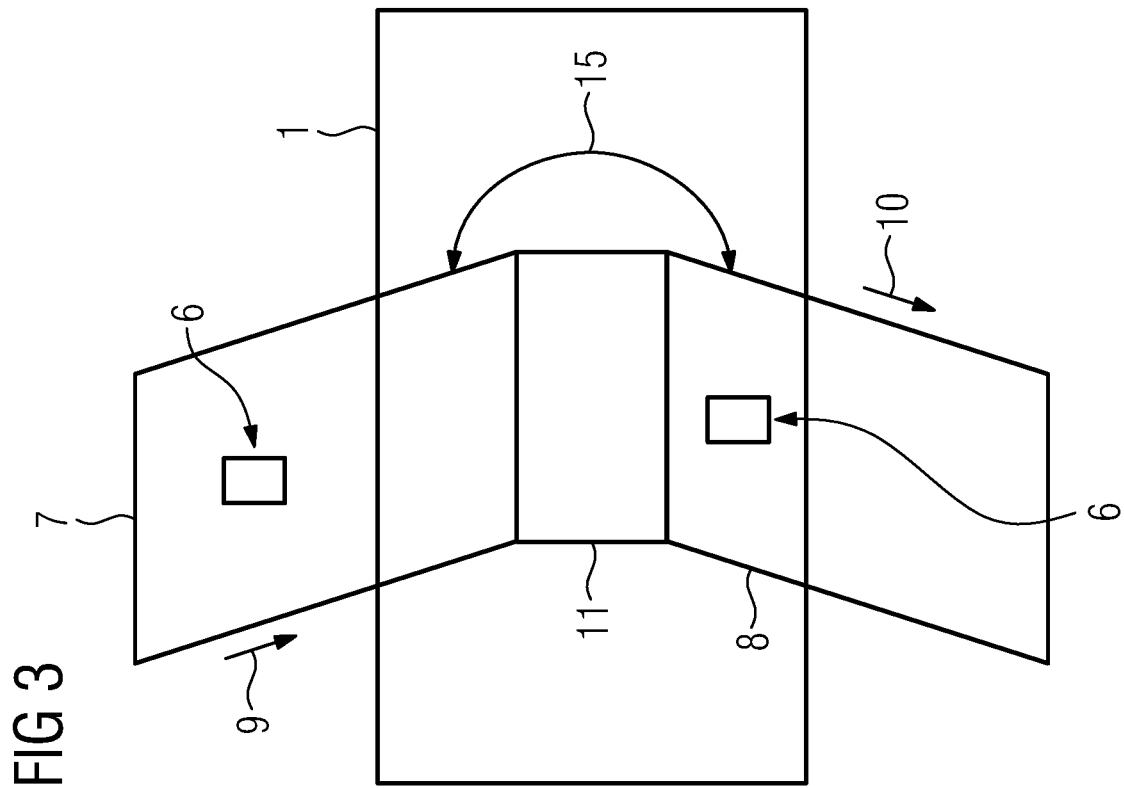

PLANT COMPRISING AT LEAST ONE APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 164 762.9 filed Mar. 28, 2018, the contents of which is incorporated herein by reference in its entirety as if set forth verbatim.

DESCRIPTION

The invention relates to a plant comprising at least one apparatus for additively manufacturing three-dimensional objects by means of successive layerwise selective irradiation and consolidation of layers of a build material which can be consolidated by means of an energy source, which plant comprises at least one module separably connected or connectable with the apparatus.

Plants comprising apparatuses for additively manufacturing three-dimensional objects are generally known from prior art. Typically, a (powdery) build material can be consolidated by means of an energy source, for example via irradiation and consolidation by an energy beam. Hence, the build material may be selectively and layerwise consolidated corresponding to object data of the object that is built during the additive manufacturing process.

Further, it is known from prior art to use modules, for example to provide build material to the at least one apparatus, to receive excess build material or to provide a build chamber in which the three-dimensional object is additively built. A respective module may separably be connected or connectable with the apparatus to perform the assigned task. After the additive manufacturing process is finished or if the module has to be changed, for example if the dose chamber of the respective module is empty or the overflow chamber is full, respectively, the module can be disconnected from the apparatus and another "fresh" module can be connected to the apparatus, for instance.

As the module in use has to be separated from the apparatus and moved to a post-processing station and the "fresh" module has to be brought to the apparatus in good time to minimize downtimes of the apparatus, comparatively high logistical effort is required. In particular, if the "fresh" module is not ready to be used in the apparatus, a downtime of the apparatus will result increasing the overall build time.

It is an object of the present invention to provide a plant comprising at least one apparatus for additively manufacturing three-dimensional objects, wherein the process liability is improved, in particular wherein the overall build time can be reduced or downtimes can be reduced or avoided, respectively.

The object is inventively achieved by a plant according to claim 1. Advantageous embodiments of the invention are subject to the dependent claims.

The plant described herein comprises at least one apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the plant comprises at least one module, in particular a plurality of modules, that can be separably connected to the at least one apparatus. The invention is based on the idea that the at least one module is movable in a loading direction into the apparatus and in an unloading direction out of the apparatus, wherein the module is moved into a work position along the loading direction and out of the work position along the unloading direction, wherein the loading direction and the unloading direction comprise at least one directional component extending in the same direction. The formulation "at least one directional component extending in the same direction" can be understood as the directions, i.e. the loading direction and the unloading direction, being vectors comprising at least one component extending in the same direction. For example, the loading direction and the unloading direction may extend in the same plane and may extend in the same or at least partially in different directions, wherein at least one component of the unloading direction and the loading direction (interpreted as vectors) is arranged in the same direction.

Thus, it is inventively achieved that a module being loaded and a module being unloaded can be moved into the same direction, or at least into a direction that comprises at least one directional component extending in the same direction. Thus, it is not necessary to separate the module from the apparatus and move the module out of the work position on the path on which the "fresh" module is being inserted into the work position. Instead, the direction in which the module that is currently in the work position is unloaded may extend at least to a defined part in the same direction (at least having one directional component extending in the same direction). This allows for having a "material flow" in a common direction or a common material flow direction (unidirectional material flow), respectively. This means that the flow of modules is directed in one common direction, as a module being unloaded will be removed from the work position on another path as another module being moved into the work position. The material flow or the module flow can therefore be deemed as being "unidirectional".

Therefore, the "loading direction" does not have to be kept free for the module that is currently in the work position to be unloaded, as the module that is currently in the work position will be unloaded along an unloading path extending along the unloading direction, wherein a "fresh" module that has to be loaded into the work position will be moved along a loading path that extends in the loading direction. The loading path and the unloading path differ which allows for already moving the "fresh" module to be moved along the loading path while the other module is still in the work position. As soon as the additive manufacturing process is finished or the module that is arranged inside the work position is to be replaced or changed, the respective module can be moved along the unloading path that extends along the unloading direction.

The "fresh" module can then be positioned without interfering with the movement path of the "used" module. Hence, downtimes of the apparatus can be reduced, as the loading of the fresh module can be performed as soon as the "used" module is removed from the work position and it is not necessary to keep the loading path free for the used module. Instead, the "fresh" module can be moved along the loading path. Therefore, the overall build time can be reduced.

According to a preferred embodiment of the inventive plant, the loading direction and the unloading direction may define a curved path and/or an alignment angle, in particular an obtuse angle, preferably between 90° and 180°, particularly preferred 180°. Thus, the loading path and the unloading path that extend along the loading direction and unloading direction, respectively, may comprise or be built as path segments that lead the module to the work position and out of the work position. The loading path and the unloading path may be partially curved in that the loading direction and the unloading direction defined a curved path. It is also possible that the loading direction and the unloading direction extend along a straight path, wherein the loading path and the unloading path are at least partially straight. Of course it is possible that the loading path and/or the unloading path are at least partially curved or straight, wherein the loading path extends towards the work position and the unloading path extends away from the work position.

Therefore, an arbitrary combination of path segments is possible to form the loading path and the unloading path, wherein the loading path and the unloading path may be deemed as being connected in the work position. Thus, at least one segment of the loading path and the unloading path or the loading direction and the unloading direction may define an angle that preferably is an obtuse angle.

Preferably, the unloading path may be connected to the loading path in the work position, wherein the loading path and the unloading path are straight and the loading direction and the unloading direction define an angle of 180° in that the loading path and the unloading path form a straight path through the work position.

Further, the loading direction and/or the unloading direction may define an application angle with an application direction in which at least one application unit is moved for providing build material onto a build plane of the at least one apparatus in particular an application angle between 60° and 140°, preferably 90°. The application direction may extend along a machine axis of the apparatus for additively manufacturing of three-dimensional objects. The machine axis may in particular lie in an x- and y-plane, preferably the build plane. The application direction may, for example extend along the direction in which an application unit of the apparatus is moved, for example a re-coater blade distributing build material from a dose plane onto a build plane.

The inventive plant may further be improved in that the at least one apparatus may comprise at least three lanes extending in loading direction and unloading direction via which different modules can be loaded, in particular powder modules, preferably a dose module on a dose lane and a build module on a build lane and an overflow module and an overflow lane. Thus, each lane comprises a loading path and an unloading path that extends along loading direction or unloading direction, respectively. The at least three lanes preferably build a side-by-side arrangement, wherein preferably the loading paths and the unloading paths of the lanes are arranged essentially in parallel. Of course, it is also possible to define arbitrary loading directions and/or unloading directions for each of the lanes.

Preferably each lane is assigned to a different type of module, wherein for example dose modules may be provided for providing build material in the additive manufacturing process. Further, build modules may be used to provide a build chamber in which the three-dimensional object is additively built. Also, an overflow module may be used to which excess build material can be deployed. For example, for each of those types of modules at least one lane may be provided, wherein dose modules may be moved on the dose lane, build modules may be moved on the build lane and overflow module may be moved on the overflow lane.

According to another embodiment of the inventive plant, the loading direction and unloading direction may be different or the same for at least two lanes. For example, the dose module may be moved along a loading path and unloading path extending along a loading direction and unloading direction, which may be different from the loading direction and the unloading direction defined for the build module and/or the overflow module. In other words, at least one module may be moved along the corresponding lane in a different direction than at least one other module is moved on the corresponding other lane. In particular, the respective modules may be moved in opposing directions along the respective lanes.

Preferably a movement direction of the dose module on the dose lane may be contrary to the movement direction of the build module on the build plane and/or the overflow module on the overflow lane. Thus, the build module and/or the overflow module may be moved in a first direction on their corresponding lanes, i.e. the build plane and the overflow lane, wherein the dose module is moved on the dose lane in the opposing or contrary direction. This allows for the arrangement of different types of post-processing stations on different sides of the apparatus, as typically the build module and/or the overflow module are moved to a handling station to remove the non-consolidated build material to empty the overflow module and/or to unpack the object built in the build module, whereas the dose module is usually moved to a refill station in which the dose chamber of the dose module is refilled with fresh build material. By moving the different types of modules in different directions, it is possible to arrange the corresponding post-processing stations, such as a handling station and/or a refill station in the corresponding direction, the respective module or type of module is moved.

At least one lane may be connected to a buffer lane in loading direction and/or in unloading direction wherein the buffer lane may be adapted to store at least one module before or after the lane. In other words, a buffer lane may be connected to the lane or the lane may comprise a buffer lane or two or more buffer lanes. The buffer lane may be connected to the loading path and/or the unloading path of the lane, wherein the buffer lane may be arranged in advance to the loading path, for example for storing one or more modules in advance to being loaded into the work position or in succession to the unloading path, for storing one or more modules that are removed from the apparatus or the additive manufacturing process, respectively.

Thus, it is possible to store at least one module on the buffer lane, for example a module that is prepared to be loaded into the work position, such as an empty overflow module or a filled dose module, for instance. Therefore, downtimes in the additive manufacturing process can further be reduced, as already prepared modules can be arranged in the buffer lane or can be buffered in advance to the work position and it is also possible to store modules that are disconnected and removed from the apparatus. Respective buffers may be deemed as loading buffer for a buffer storing at least one module in advance to the work position (along the loading path) or deemed as unloading buffer for a buffer storing at least one module in succession to the work position (along the unloading path), respectively. Of course, the loading path and the unloading path can as well be used as buffer lanes.

The plant may further comprise multiple apparatuses, wherein at least two apparatuses are arranged in series in that one lane connects two corresponding work positions of two apparatuses. Thus, it is possible that the corresponding lanes of the first apparatus may be connected to the lanes of the second apparatus, wherein the types of lanes or the lanes on which different types of modules are moved, correspond to the respective lanes of the other apparatus. Thus, it is possible to move the respective modules along the lanes, wherein after an additive manufacturing process in a first apparatus has been finished, it is possible to move at least one module to another apparatus, in which, for example a second process step may be performed. It is also possible to prepare the respective module for the additive manufacturing process performed in the at least one other apparatus before the module reaches the work position in the at least one other apparatus.

It is also possible that the plant may comprise multiple apparatuses, wherein at least two apparatuses are arranged in parallel. Thus, at least two or in particular a plurality of apparatuses can be arranged in parallel and/or in series. Each apparatus may comprise at least one, preferably at least three, lanes along which a corresponding module can be moved. By arranging a plurality of apparatuses in parallel, it is possible to perform multiple additive manufacturing processes in parallel, for example for manufacturing large-scale.

At least one apparatus of the inventive plant may be connected via at least one lane with at least one pre-processing and/or at least one post-processing device, wherein at least one module is movable along the at least one lane from the pre-processing and/or post-processing device to the work position of the apparatus and/or from the work position of the apparatus to the pre-processing and/or post-processing device. This allows for preparing the module for the additive manufacturing process, for example a dose module may be filled with "fresh" build material in the pre-processing device. The pre-processing and/or post-processing device may also be built as a handling station, in which non-consolidated build material may be removed from the build module and/or the overflow module. It is also possible to remove the additively built object from the build module in a post-processing device. Of course, dependent on the type of module, the pre-processing and/or post-processing device can be chosen appropriately. After the corresponding module has been treated with the pre-processing and/or post-processing device, the module may be used for another additive manufacturing process.

According to another embodiment of the inventive plant, at least one pre-processing and/or post-processing device may be arranged between two apparatuses that are arranged in series. Thus, a module exiting a work position in a first apparatus may be moved along the corresponding lane into the pre-processing and/or post-processing device. The module can be prepared for the next additive manufacturing process, for example by refilling a dose chamber of the dose module that is moved along the dose lane or emptying the chamber of a build module and/or overflow module.

After the corresponding module has been treated via the pre-processing and/or post-processing device, the module can further be moved along the lane towards the next additive manufacturing apparatus that is connected with the corresponding lane. Thus, as multiple apparatuses may be arranged in series and the module may be prepared for the next upcoming additive manufacturing process that is performed by the next additive manufacturing apparatus that is arranged downstream the lane, the additive manufacturing process can be improved, as downtimes can be reduced and the module is moved from one additive manufacturing apparatus to the next, wherein the module is prepared for the next additive manufacturing process on the corresponding lane by being moved to and being processed in the pre-processing and/or post-processing device.

The inventive plant may further be improved in that the at least one pre-processing and/or post-processing device comprises one track for providing fresh modules and for discharging used modules or the at least one pre-processing and/or post-processing device comprises one provision track for providing fresh modules and one discharge track for discharging used modules. According to this embodiment, the pre-processing and/or post-processing device may comprise a track that is different from the lane connecting the pre-processing and/or post-processing device to the preceding and/or succeeding apparatus for additively manufacturing of three-dimensional objects. The track is used to provide and/or discharge modules from the pre-processing and/or post-processing device.

In other words, modules that are removed from an additive manufacturing apparatus via the lane can be moved to the pre-processing and/or post-processing device. It is possible that fresh modules are provided via the track and can be moved further along the lane towards the next additive manufacturing apparatus and that used modules are discharged via the track. It is also possible that the pre-processing and/or post-processing device comprises a provision track on which fresh modules can be provided and can be moved to the lane to be moved towards the next additive manufacturing apparatus. Further, one separate discharge track may be provided for discharging used modules, i.e. a track on which used modules may be discharged from the pre-processing and/or post-processing device. Of course, it is also possible that, for example dependent on the type of module, some modules may be pre-processed and/or post-processed in the pre-processing and/or post-processing device and other modules may be replaced with "fresh" modules and be discharged from the pre-processing and/or post-processing device.

According to another embodiment of the inventive plant, at least one utility unit of at least one apparatus may be arranged adjacent to the at least one lane. A corresponding utility unit may comprise at least one unit that is used in the additive manufacturing process of the apparatus, such as a stream generating device and/or a filter unit and the like. The utility unit may be arranged adjacent to the at least one lane for example adjacent to the at least one apparatus. Thus, the utility unit is not in the path of the module that is moved along the lane and may be arranged closely to the apparatus to be used efficiently in the additive manufacturing process.

Besides, the invention relates to an apparatus for additively manufacturing of three-dimensional objects by means of successive layerwise selective irradiation and consolidation of layers of a build material which can be consolidated by means of an energy source, in particular an apparatus for an inventive plant, as described before, wherein at least one module is separably connected or connectable with the apparatus, wherein the at least one module is moveable in a loading direction into the apparatus and in an unloading direction out of the apparatus, wherein the module is moved into a work position along the loading direction and out of the work position along the unloading direction, wherein the loading direction and the unloading direction comprise a directional component extending in the same direction.

Further, the invention relates to a method for operating at least one plant comprising at least one apparatus for additively manufacturing three-dimensional objects by means of successive layerwise selective irradiation and consolidation of layers of a build material which can be consolidated by means of an energy source, which plant comprises at least one module separably connected or connectable with the apparatus, wherein the at least one module is moveable or moved in a loading direction into the apparatus and in an unloading direction out of the apparatus, wherein the module is moved into a work position along the loading direction and out of the work position along the unloading direction, wherein the loading direction and the unloading direction comprise a directional component extending in the same direction.

Of course, all details, features and advantages described with respect to the inventive plant, are fully transferable to the inventive apparatus and the inventive method. Preferably, the inventive method may be performed on the inventive plant using at least one inventive apparatus. To perform the method the plant may comprise a control unit that is adapted to coordinate the movement of the at least one module, in particular to coordinate the movements of the plurality of modules.

Figure 2:
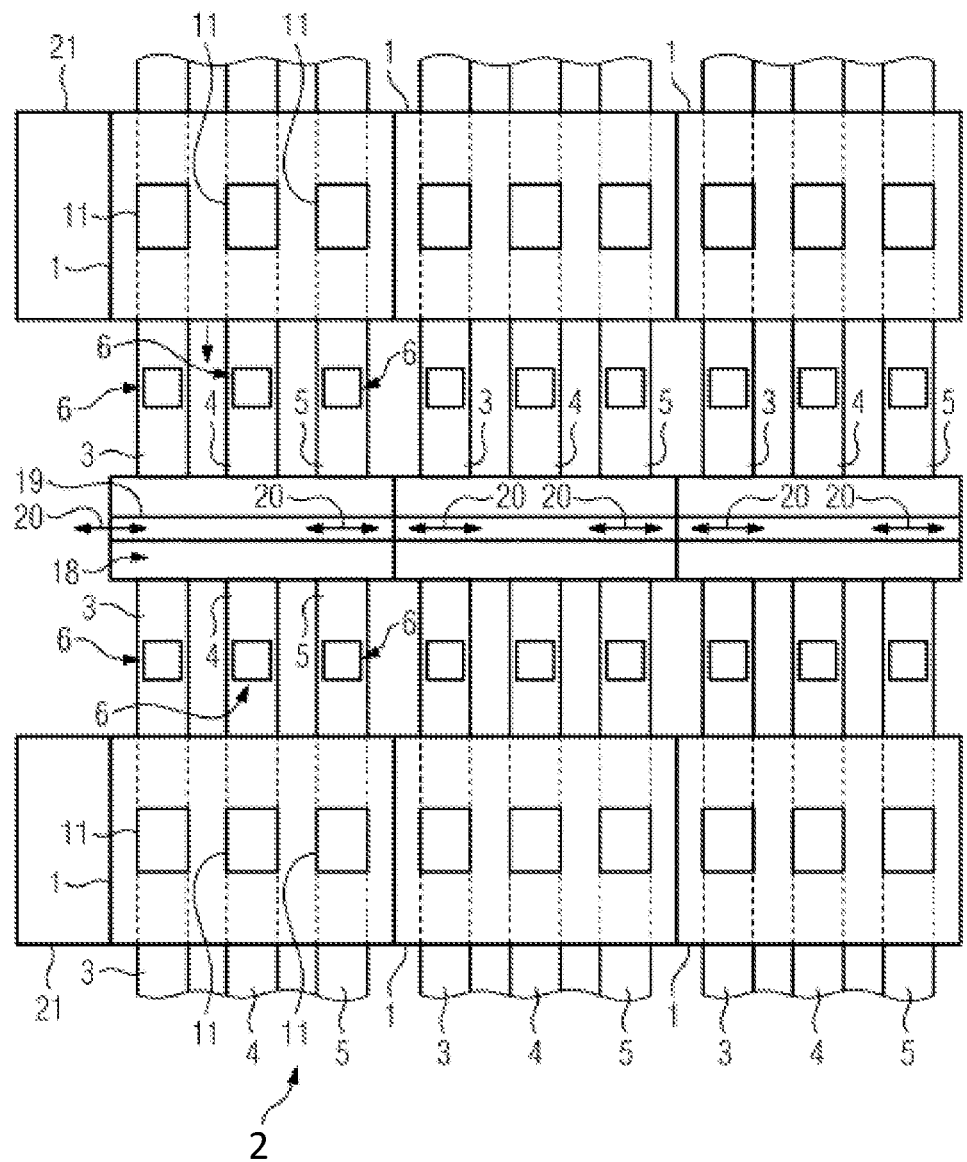

Exemplary embodiments of the invention are described with reference to the FIG. The FIG. are schematic diagrams, wherein FIG. 1 shows an inventive apparatus;
FIG. 2 shows an inventive plant;
FIG. 3 shows an inventive apparatus.

FIG. 1 shows an apparatus 1 for additively manufacturing three-dimensional objects by means of successive layerwise selective irradiation and consolidation of layers of a build material which can be consolidated by means of an energy source. In the embodiment depicted in FIG. 1, the apparatus 1 is comprised in a plant 2 that comprises multiple apparatuses 1 for additively manufacturing three-dimensional objects, as will be described with respect to FIG. 2 below.

The apparatus 1 is connected to three lanes 3, 4, 5, wherein modules 6 may be moved along the lanes 3-5 into the apparatus 1 and out of the apparatus 1. In particular, each lane 3-5 comprises a loading path 7 and an unloading path 8, wherein the loading path 7 extends in a loading direction 9 and the unloading path 8 extends in an unloading direction 10. In this exemplary embodiment the lanes 3-5 are arranged side-by-side in a parallel arrangement, wherein the loading directions 9 and the unloading directions 10 for the loading paths 7 and the unloading paths 8 are the same for all lanes 3-5 (optional).

As can further be derived from FIG. 1, the module 6 can be moved from outside the apparatus 1 via the loading path 7 into the apparatus 1, in particular into a work position 11. With the corresponding module 6 in the work position 11, the additive manufacturing process can be performed in the additive manufacturing apparatus 1. For example, the modules 6 that are moved along the lane 3 may be built as a dose modules 12, for instance. The lane 3 can therefore, also be deemed as "dose lane". The modules 6 that are moved on the lane 4 can be deemed as build modules 13 and the modules 6 that are moved along the lane 5 can be deemed as overflow modules 14. Thus, the lane 4 may be a "build lane" and lane 5 may be an "overflow lane".

The loading path 7 and the unloading path 8 define an angle, which is 180° in this exemplary embodiment. Of course, the loading direction 9 and the unloading direction 10 also define the same angle, as the loading path 7 extends along the loading direction 9 and the unloading path 8 extends along the unloading direction 10. FIG. 1 further shows that the flow direction in which the modules 6 flow along the lanes 3-5 is unidirectional, as the module 6 are inserted into the apparatus 1 in the same direction as the modules 6 are removed from the apparatus 1. Thus, "fresh" modules may already be moved towards the apparatus 1 along the lanes 3-5, in particular along the loading path 7, while used modules 6 may be removed from the apparatus 1 along the unloading paths 8.

The plant 2 may further comprise a loading buffer 16 and an unloading buffer 17, wherein each buffer 16, 17 is adapted to store at least one module 6 in advance of the apparatus 1, in particular in advance of the work position 11 (loading buffer 16) or in succession to the work position 11 of the apparatus 1 (unloading buffer 17). Thus, respective modules 6 may be stored in advance to the additive manufacturing process, in that if the additive manufacturing process is finished, the module 6 required for performing the next additive manufacturing process or process step, is already in the position, in particular on the loading path 7, to be moved into the work position 11.

Similarly, after the additive manufacturing process is finished, the respective module 6 may be arranged in the unloading buffer 17 to be moved to a respective pre-processing and/or post-processing device 18, as will be described with respect to FIG. 2. The plant 2 according to the exemplary embodiment depicted in FIG. 2 comprises a plurality of apparatuses 1, wherein exemplarily three apparatuses 1 are arranged in parallel and two apparatuses 1 are arranged in series. The lanes 3-5 connect the apparatuses 1 that are arranged in series, wherein the lane 3 of the apparatus 1 is connected with the corresponding lane 3 of the apparatus 1 that is arranged downstream of the lane 3. Of course, the same applies to the lanes 4, 5 being connected to the corresponding lanes 4, 5 of the other apparatuses 1.

Between two apparatuses 1, that are arranged in series, a pre-processing and/or post-processing device 18 is arranged that is adapted to pre-process and/or post-process the respective module 6. In other words, the module 6 that is removed from the apparatus 1 is moved along the lane 3-5 towards the pre-processing and/or post-processing device 18.

Thus, the module 6 can be provided to the pre-processing and/or post-processing device 18. The pre-processing and/or post-processing device 18 may for example be adapted to refill the dose chamber of the dose module 12, or to post-process the build module 13 and/or the overflow module 14, for example by removing non-consolidated build material and/or the object that has additively being built in the previous additive manufacturing process. After the module 6 has been pre-processed and/or post-processed, the module 6 can be moved from the pre-processing and/or post-processing device 18 along the corresponding lanes 3-5 towards the next additive manufacturing apparatus 1 for performing the next additive manufacturing process.

The pre-processing and/or post-processing device 18 may also comprise a track 19 (optional), in particular a provision and/or discharge track. Along the provision and/or discharge track 19 modules 6 may be moved into the pre-processing and/or post-processing device 18 and out of the pre-processing and/or post-processing device 18 (as indicated via arrows 20. Thus, fresh modules 6 may be inserted into the provision and/or discharge track 19 and maybe pre-processed to be moved along the lanes 3-5 to the next apparatus 1 or module 6 may be removed from the pre-processing and/or post-processing device 18 via the provision and/or discharge track 19.

Self-evidently, an arbitrary number of apparatuses 1 may be arranged in parallel and/or in series. Further, an arbitrary combination and/or use of pre-processing and/or post-processing devices 18 is feasible. The movement direction of the modules 6 on the respective lanes 3-5 is also arbitrary. For example, modules on the lane 3 may be moved into the opposite direction, as modules 6 on the lanes 4 and 5 or any other arbitrary combination of movement directions of the single modules 6 moved on the different lanes 3-5. It is also possible that the lanes 3-5 comprise at least one curved section and/or that the angle 15 deviates from 180°. It is also possible that the angle 15 is different for each lane 3-5 or for at least one or more of the lanes 3-5 compared to the other lanes 3-5.

Additionally, the apparatus 1 further comprises a utility unit 21 in which functional components or units of the apparatus 1 are comprised, such as stream generating units, filter units and the like. The plant 2 further comprises a control unit (not shown) that is adapted to control the movements of each module 6 and the operations performed by each of the apparatuses 1. It is particularly possible to load the buffer regions 16 with corresponding modules 6 in the order that is predetermined via the additive manufacturing process that is to be performed by the respective apparatus 1. It is also possible, to manipulate the modules 6 being staged in the buffer regions 16.

Thus, it is possible to plan the additive manufacturing processes in good time and to provide the respective modules 6 in the buffer regions 16 of the lanes 3-5. Thus, if an additive manufacturing process is finished by the apparatus 1, the next module 6, in particular the next triplet of modules 12, 13, 14, can be loaded into the work position 11 along the loading direction 9. Hence, process time can be saved and the overall build time of three-dimensional objects can be reduced.

FIG. 3 shows an apparatus 1 according to another exemplary embodiment, wherein the loading direction 9 and the unloading direction 10 exemplarily enclose an angle 15 deviant from 180°. Thus, modules 6 can be moved along the loading path 7 towards the work position 11 and from the work position 11 out of the apparatus 1 via the unloading path 8, as described before. Thus, FIG. 3 can be understood as equivalent diagram showing the loading direction 9 and the unloading direction 10 that can be understood as vectors pointing the direction in which the module 6 are moved along the loading path 7 and the unloading path 8. Hence, the loading direction 9 and the unloading direction 10 enclose the angle 15, which of course can be defined as obtuse angle or acute angle. As can further be derived from FIG. 3, the loading direction 9 and the unloading direction 10 comprise a directional components 22 extending in the same direction.

Of course, the inventive method may be performed on the inventive plant 2.

The invention claimed is:

1. Plant (2) comprising at least one apparatus (1) for additively manufacturing three-dimensional objects by means of successive layerwise selective irradiation and consolidation of layers of a build material which can be consolidated by means of an energy source, which plant (2) comprises at least one module (6, 12-14) separably connected or connectable with an apparatus (1), characterized in that the at least one module (6, 12-14) is moveable in a loading direction (9) into the apparatus (1) and in an unloading direction (10) out of the apparatus (1), wherein the module (6, 12-14) is moved into a work position (11) along the loading direction (9) and out of the work position (11) along the unloading direction (10), wherein the loading direction (9) and the unloading direction (10) comprise at least one directional component (22) extending in the same direction and wherein, a movement direction of a dose module (12) on a dose lane (3) is contrary to the movement direction of a build module (13) on a build lane (4) and/or an overflow module (14) on an overflow lane (5).

2. Plant according to claim 1, characterized in that the loading direction (9) and the unloading direction (10) define a curved path and/or an alignment angle (15), in particular an obtuse angle, preferably between 90° and 180°, particularly preferred 180°.

3. Plant according to claim 1, characterized in that the loading direction (9) and/or the unloading direction (10) define an application angle with an application direction in which at least one application unit is moved for providing build material onto a build plane of the at least one apparatus (1), in particular an application angle between 60° and 140°, preferably 90°.

4. Plant according to claim 1, characterized in that the at least one apparatus (1) comprises at least three lanes (3-5) extending in loading direction (9) and unloading direction (10) via which different modules (6, 12-14) can be loaded, in particular powder modules (6, 12-14), preferably a dose module (12) on a dose lane (3) and a build module (13) on a build lane (4) and an overflow module (14) on an overflow lane (5).

5. Plant according to claim 1, characterized in that the loading direction (9) and unloading direction (10) are different or the same for at least two lanes (3-5).

6. Plant according to claim 1, characterized in that at least one lane (3-5) is connected to a buffer lane (16, 17) in loading direction (9) and/or in unloading direction (10), wherein the buffer lane (16, 17) is adapted to store the at least one module (6, 12-14) before or after the at least one lane (3-5) which is connected to the buffer lane.

7. Plant according to claim 1, characterized in that the plant (2) comprises multiple apparatuses (1), wherein at least two apparatuses (1) are arranged in series and one lane connects two corresponding work positions (11) of two apparatuses (1).

8. Plant according to claim 1, characterized in that the plant (2) comprises multiple apparatuses (1), wherein at least two apparatuses (1) are arranged in parallel.

9. Plant according to claim 1, characterized in that at least one apparatus (1) is connected via at least one lane (3-5) with at least one pre-processing and/or post-processing device (18), wherein at least one module (6, 12-14) is movable along the at least one lane (3-5) from the pre-processing and/or post-processing device (18) to the work position (11) of the apparatus (1) and/or from the work position (11) of the apparatus (1) to the pre-processing and/or post-processing device (18).

10. Plant according to claim 1, characterized in that at least one pre-processing and/or post-processing device (18) is arranged between two apparatuses (1) that are arranged in series.

11. Plant according to claim 10, characterized in that the at least one pre-processing and/or post-processing device (18) comprises one track (19) for providing fresh modules and for discharging used modules or the at least one pre-processing and/or post- processing device (18) comprises one provision track (19) for providing fresh modules- and one discharge track (19) for discharging used modules.

12. Plant according to claim 1, characterized in that at least one utility unit (21) of at least one apparatus (1) is arranged adjacent to the at least one lane.

13. Apparatus (1) for additively manufacturing of three-dimensional objects by means of successive layerwise selective irradiation and consolidation of layers of a build material which can be consolidated by means of an energy source, in particular an apparatus (1) for a plant (2) according to claim 1, wherein at least one module is separably connected or connectable with the apparatus (1), characterized in that the at least one module is moveable in a loading direction (9) into the apparatus (1) and in an unloading direction (10) out of the apparatus (1), wherein the at last one module is moved into a work position (11) along the loading direction (9) and out of the work position (11) along the unloading direction (10), wherein the loading direction (9) and the unloading direction (10) comprise a directional component (22) extending in the same direction.

14. Method for operating at least one plant (2) comprising at least one apparatus (1) for additively manufacturing three-dimensional objects by means of successive layerwise selective irradiation and consolidation of layers of a build material which can be consolidated by means of an energy source, which plant (2) comprises at least one module (6, 12-14) separably connected or connectable with the apparatus (1), characterized in that the at least one module (6, 12-14) is moveable or moved in a loading direction (9) into the apparatus (1) and in an unloading direction (10) out of the apparatus (1), wherein the module (6, 12-14) is moved into a work position (11) along the loading direction (9) and out of the work position (11) along the unloading direction (10), wherein the loading direction (9) and the unloading direction (10) comprise a directional component (22) extending in the same direction.

* * * * *